US008495556B2

(12) United States Patent
Green

(10) Patent No.: US 8,495,556 B2
(45) Date of Patent: Jul. 23, 2013

(54) CIRCUIT VISUALIZATION USING FLIGHTLINES

(75) Inventor: Michael Green, Ottawa (CA)

(73) Assignee: Chipworks Inc., Ottawa, Ontario (CA)

( * ) Notice: Subject to any disclaimer, the term of this patent is extended or adjusted under 35 U.S.C. 154(b) by 0 days.

(21) Appl. No.: 12/942,114

(22) Filed: Nov. 9, 2010

(65) Prior Publication Data
US 2012/0117530 A1    May 10, 2012

(51) Int. Cl.
*G06F 17/50* (2006.01)
(52) U.S. Cl.
USPC ............................................ 716/139; 716/138
(58) Field of Classification Search
USPC ................. 716/100, 102, 105–108, 138, 139
See application file for complete search history.

(56) References Cited

U.S. PATENT DOCUMENTS

| 6,980,211 | B2 * | 12/2005 | Lin et al. ...................... 345/440 |
| 7,383,525 | B2 | 6/2008 | Oda et al. |
| 7,784,008 | B1 * | 8/2010 | Hutton et al. ................. 716/126 |
| 8,078,980 | B2 * | 12/2011 | Fuller et al. ................... 715/763 |
| 2004/0117750 | A1 * | 6/2004 | Skoll et al. ....................... 716/11 |
| 2009/0064077 | A1 * | 3/2009 | Uppaluri et al. ................ 716/11 |
| 2009/0241069 | A1 * | 9/2009 | Fuller, III et al. ............. 715/854 |

FOREIGN PATENT DOCUMENTS
WO    99/13420    3/1999

OTHER PUBLICATIONS

Shneiderman et al, "Network Visualization by Semantic Substrates", IEEE Transactions on Visualization and Computer Graphics, vol. 12, No. 5, Sep./Oct. 2006 (Oct. 31, 2006).
International Search Report for PCT Application # PCT/IB2011/054296, mailed Feb. 29, 2012.
Written Opinion of the International Searching Authority for PCT Application # PCT/IB2011/054296, mailed Feb. 29, 2012.

* cited by examiner

*Primary Examiner* — Thuan Do
*Assistant Examiner* — Mohammed Alam
(74) *Attorney, Agent, or Firm* — Kent Daniels; Daniels IP Services Ltd.

(57) ABSTRACT

A system is disclosed for displaying circuitry interconnections as flightlines between a component specified as the local component and the foreign components connecting to the local component. Upon obtaining data of the circuit components and interconnections, a user can designate the local component from among all of the circuit components. The system determines the foreign components connected to that local component, retrieves the flightline appearance display settings for the computer display, and renders a view of the specified local component and its foreign components with flightlines representing each interconnection connection. The flightlines can be color coded to indicate inputs, outputs or other characteristics of interest to the user.

22 Claims, 8 Drawing Sheets

400   component-to-component mode

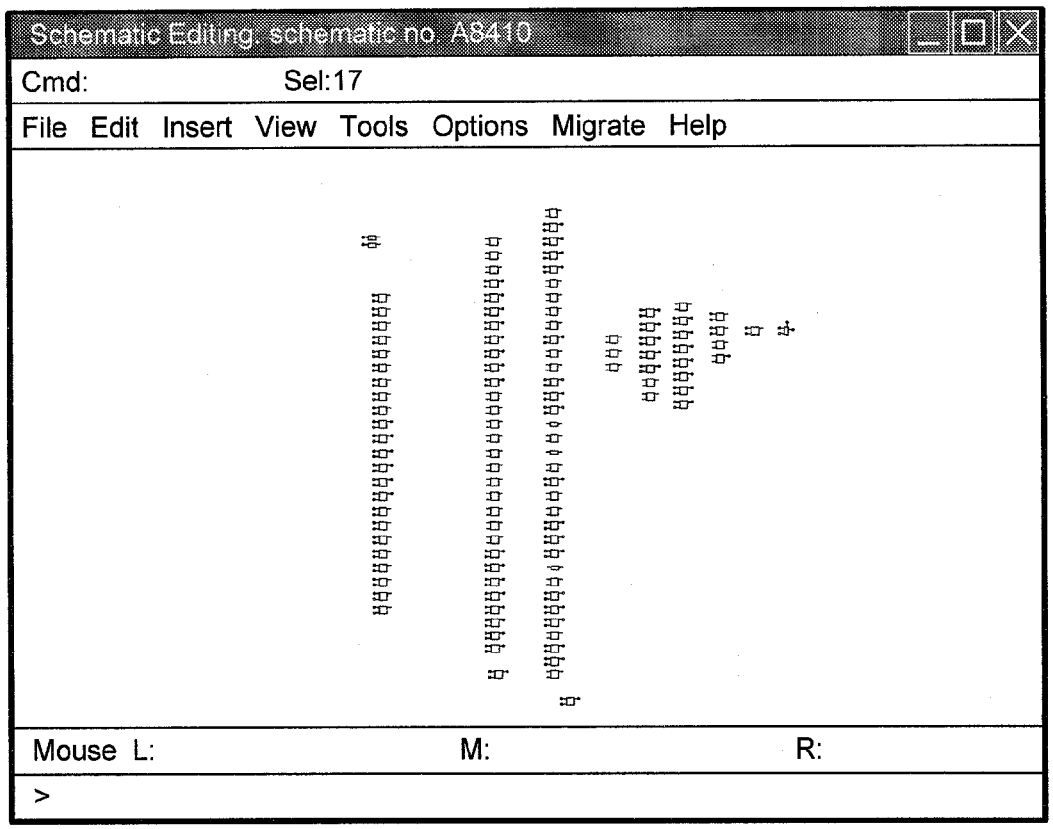
200          FIG. 2
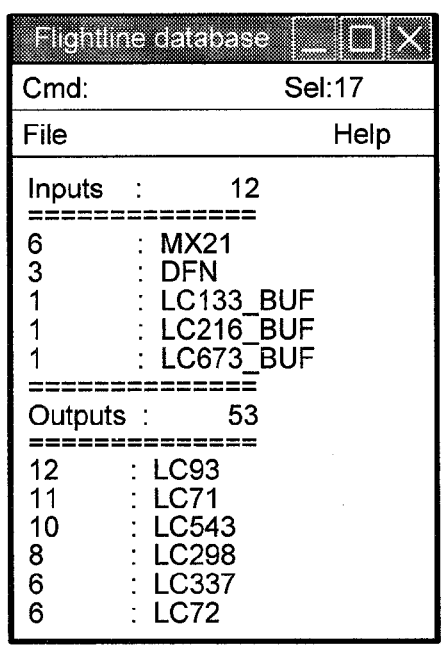
FIG. 3
300

400 component-to-component mode 500 component-to-component mode,
multiple components of interest 600 pin-to-pin mode

CIRCUIT VISUALIZATION USING FLIGHTLINES

BACKGROUND

1. Technical Field

Various embodiments of the present invention relate to electronic circuitry, and more specifically, to tools for analyzing the interconnection between electronic circuitry components.

2. Description of Related Art

Electronic circuitry consists primarily of elements and connections between elements. There is often a need to understand how a particular circuit operates based on observation of the circuit itself. This may be done by having engineers trace the various circuitry connections one by one, and organize the components based on their connections. The engineers may arrive at a plausible organization of the entire circuit in a reasonable amount of time for circuits that are simple with a relatively small number of components and connections. However, as the number of elements and connections grows, this traditional method becomes increasingly difficult to use. A modest digital circuit may contain tens of thousands of components, and at least as many connections between them. Some modern circuitry assemblies may have many hundreds of thousands of elements, and a comparable number of connections between the elements. Tracing connections one-by-one is not practical in these cases. It would take far too much time to understand anything more than a trivial circuit using this inefficient conventional approach.

Conventional schematic editor tools are available on the market such as Cadence's Virtuoso Schematic Editor. However, the conventional schematic editor tools are quite limited in their ability to categorize, manipulate and display circuitry components. What is needed is an improved system for organizing and displaying unorganized circuitry components.

BRIEF SUMMARY

In order to understand how a complicated circuit functions there is a need to organize the circuit in some manner. Various embodiments disclosed herein allow engineers to visualize connections between components in a faster and more efficient manner than can be done using conventional methods. The various embodiments display many connections at once, with information about the connections coded in a visual format directly on the circuit under analysis.

According to at least some of the various embodiments a method of presenting a display of circuitry interconnections between components of a circuit is provided. Flightline display settings are obtained, for example, by retrieving them from memory. The flightline display settings control the appearance characteristics of flightlines which represent the connections between predefined components of the circuit. The flightline display settings may be reconfigurable by a user of the system. The system displays a local component of the circuit, typically indicated by a user, and any foreign components connected to the local component. The system also displays flightlines representing the connections between the local component and foreign components. The appearance characteristics of the flightline are controlled by the flightline display settings, which may be user specified.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 2 shows an example of an arrangement of numerous components according to signal flow;

FIG. 3 depicts an example of flightlines presented as data;

DETAILED DESCRIPTION

Figure 1:
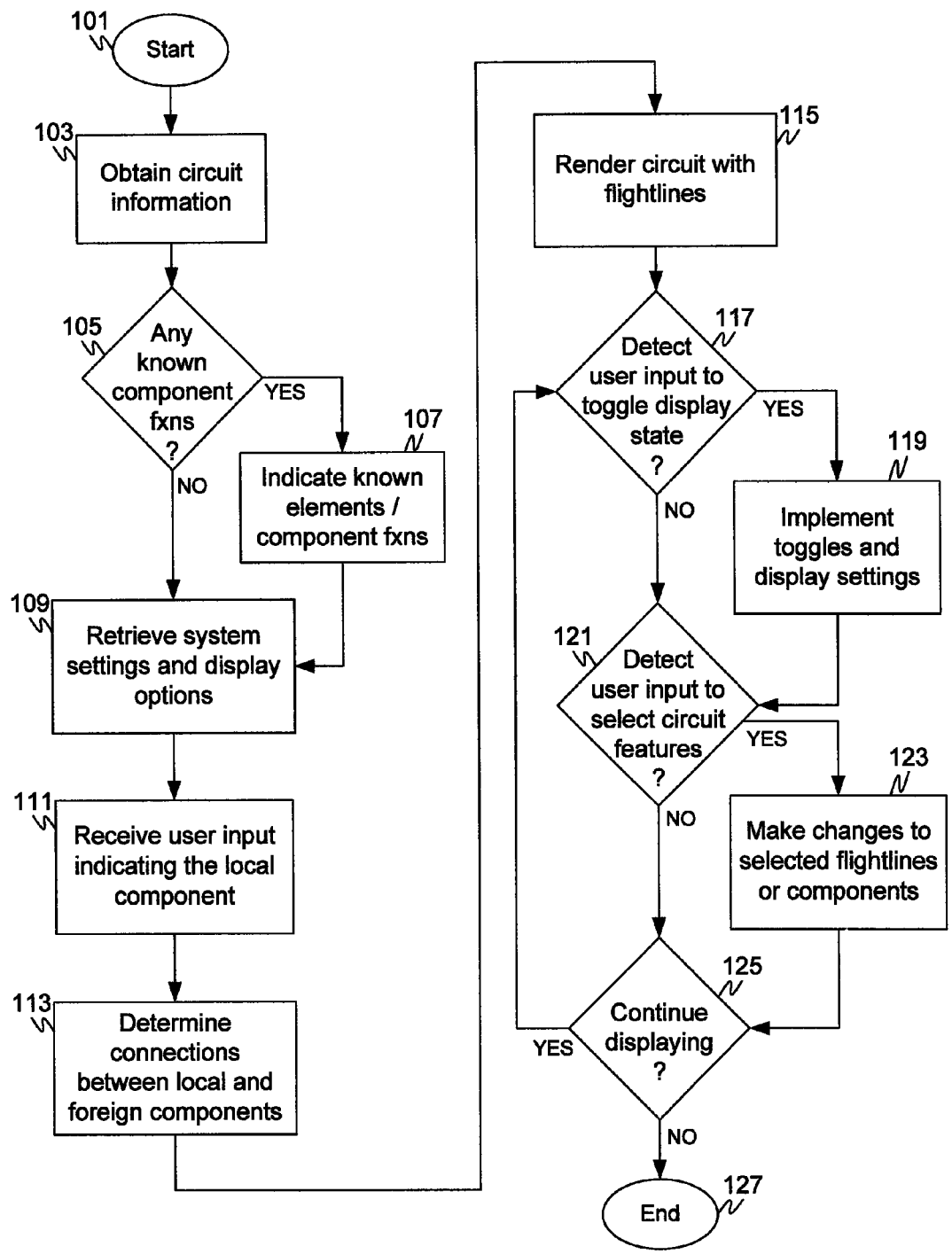
FIG. 1 is a flowchart of a method for displaying flightlines interconnecting circuitry components.

FIG. 1 depicts a flowchart of a method for displaying flightlines interconnecting circuitry components. A number of terms of art and phrases are used in the ensuing explanation of the various embodiments. The definitions and meanings of these terms and phrases are consistent with their use in the art. The term flightline is a term used throughout this disclosure. (The term flightline may also be known by the two words, flight line, or hyphenated as flight-line.) A flightline is a visually coded indication of the connection between one component and another in a circuit. Each flightline is characterized with a local end and a foreign end. (The local end may also be referred to as "in focus" or other like term.) The local end indicates the component of interest for that view. The foreign end indicates a component to which the component of interest connects. The local component is the component of interest for a given view in which the user would like to see flightlines. (There may be many other views, each with its own component of interest.) A foreign component is a component to which the local component is connected via a flightline. A circuit assembly or circuit diagram includes a number of components. The terms component and circuit element can be used interchangeably. Components may be represented by circuitry symbols in a schematic or other representation of a circuit assembly. The function and operational characteristics of a component are often known. In some instances, however, the function of a component may not be known. A component may be treated as a black-box entity, with no further insight to be gleaned by looking inside it. Some common components include single analog devices (e.g., transistors, resistors, capacitors) or digital logic gates whose function is known (e.g., AND, NOR, XOR, buffer or inverter gates). The term rendering refers to the generation of, or the process of generating, an image from data by means of computer software. The data typically includes all information needed to generate the image such as positioning data, component shape data, component connection data, text description data, and color data. The image may be a digital image or raster graphics image.

Turning to FIG. 1, the method begins at 101 and proceeds to 103 to obtain circuit information for use in creating a display of the circuit components and interconnections. The circuit information may be obtained in a number of different manners. In some instances photographic techniques are used to capture images of the various substrate and routing levels which may then be analyzed to determine the placement of components and circuit traces interconnecting the components. In other instances, the circuit information may be obtained in the form of data from specifications, schematics, netlists or drawings that may be available. In yet other instances, one or more engineers may be called upon to visually examine the circuit, either to create or verify the circuit information to be obtained in block 103.

Once the circuit information has been obtained in 103 the method proceeds to block 105 to determine whether any of the circuit elements or components have known functions such as AND, OR, XOR or NOR or other logic gates, buffers, inverters, transistors, flip-flops, or other such circuitry devices. If no circuit components or elements have known functions the method proceeds from 105 along the "NO" path to 109. However, if it is determined in 105 that the function is known for one or more components or elements the method proceeds from 105 to 107 along the "YES" path. If any of the circuit elements or components are known then the function can be indicated on the display either by the shape of the component/element, by a note appended to the drawing, or other visual indicator of the function. In some instances the system function may be set to display the function or parameters in a pop-up window viewable in response to a user input such as hovering a mouse over the component or right clicking the mouse on the component. Typically, the component function and any known characteristics or parameters are recorded in the database or other computer file for future reference. Upon completing 107 the method proceeds to block 109.

In block 109 the system retrieves the system parameters and flightline display settings that control how data will be handled and displayed. The flightline visualization system can be set up to operate in any of several basic modes. The component-to-component mode is described in further detail below, in conjunction with FIG. 4. The text accompanying FIG. 5 discusses the mode where multiple components of interest are specified. The pin-to-pin mode is described in further detail below, in conjunction with FIG. 6. Various other modes of operation and display settings may be retrieved in block 109 as well. The flightline display settings specify the color coding scheme and line design/weight for the flightlines or other appearance characteristics such as the manner in which multiple flightlines between components are to be displayed, the available modes/display options that the user can toggle between, or other like parameters or settings. In various embodiments the flightline display settings are reconfigurable. For example, a user can specify the colors, lineweight, line design, or other appearance characteristics of the flightlines by inputting the choices for flightline display settings into the flightline visualization system (e.g., using a mouse, keyboard, or other user input device). The flightline visualization system accepts one or more user inputs specifying the flightline display settings to control the appearance of the flightlines. The flightline display settings are stored in a file or other code in a location that can readily be retrieved by the flightline visualization system. Once the predefined system parameters and flightline display settings are retrieved in 109 the method proceeds to block 111.

In block 111 the flightline visualization system accepts an input from the user indicating the circuit component to treat as a local component (component of interest) for the view. The input may be entry of a component identifier, or may be made by the user with a graphical user input (GUI) device, e.g., a mouse click on the component, or any other input suitable for conveying which component is to be treated as the component of interest. Once the system receives an indication of the selection for the local component in block 111 the method proceeds to 113. In block 113 the flightline visualization system determines, or otherwise obtains, the connections between the local component and its foreign components. This is done as a precursor to displaying flightlines for the local component. For embodiments that display the circuit components graphically there is typically an associated database of information for the circuit components that includes component connection information as well as information about the positioning of the component and other component parameters. In such instances the connections between the designated local component and its foreign components may be retrieved from the database. However, if the connection information is incomplete or otherwise unavailable the system obtains (or completes) the connection information, for example, as described above in conjunction with block 103. Upon determining the connection information in 113 the method proceeds to block 115.

In block 115 the flightlines are rendered visually on a circuit diagram showing the local component, the connected foreign components, and possibly other nearby components as well. The circuit diagram conveys component information and connection information, but does not necessarily depict the actual circuit layout, component positioning, and circuit traces that can be seen on the actual, physical circuit assembly. Instead, each flightline represents a connection between the designated local component and a foreign component. A flightline does not necessarily follow the same path as the conductive circuit trace connecting the two components which may wind around various components and other traces to make an electrical connection on the circuit assembly. In block 115 the flightlines are rendered in accordance with the system parameters and flightline display settings retrieved in 109 which control the appearance characteristics of the flightlines. These settings determine the color and any other visual coding for the flightlines. For circuit analysis purposes it is useful to be able to toggle between different settings and display options. The flightline visualization system allows users to toggle between the initial default display setting state and one or more predefined optional display setting states. For example, one display state may indicate which local component outputs are high for a given flightline logic state or component input. In another example the user may desire to toggle to a view that eliminates the ground and power supply connections and highlights the signal path connections. Another toggle option is the option to erase all flightlines from the screen without disturbing the underlying circuit. The zoom feature is another useful option allowing the user to zoom the schematic view in any of several manners. One zoom toggle key allows the user to bring all foreign components of the selected local component into view (e.g., key "2"). For the embodiment with multiple local components there is an option to toggle the system to zoom to all local components (e.g., key "3"). Another manner of zooming allows the user to locate the foreign components associated with selected flightlines, and zoom to bring these components into view (e.g., key "4"). Many other display options are described throughout this disclosure. These various display options can be associated with predefined toggle keys, allowing the user a convenient means of implementing the display state option by selecting the toggle key.

Block 117 involves the flightline visualization system detecting whether or not a user input has been received to change the display state. If a user input to a predefined toggle key is detected the method proceeds from 117 along the "YES" path to block 119 to implement the desired display option and render the flightlines in accordance with the system parameters and flightline display settings for the selected toggle state. However, if no user display state input or toggle key input is detected in block 117 then the method proceeds from 117 along the "NO" path to 121 to determine whether the user has selected any flightlines or components on the circuit visualization. The visualization system allows the user to select or deselect a flightline or a component to make display alterations or other changes. Groups of flightlines or groups of components can also be selected. A user can select flightlines or components by drawing a selection box around them, or by clicking on them individually with the mouse, or other like manner of indicating the flightlines or components to be selected. Holding a predefined key (e.g., the Shift key or Control key) while selecting will add lines to the selected set. If a group of flightlines (or components) has been selected, a particular flightline can be deselected by pressing another predefined deselect key while hovering over the flightline. The visualization system also allows the user to select and/or deselect flightlines based on their type. For example, the system allows the user to select all input flightlines by providing a predetermined input (e.g., depressing the "8" key) or select all output flightlines with another predetermined input (e.g., key "9").

Selecting one or more components or flightlines allows the user to perform various operations on those components/flightlines. For example, the user can change the flightline display settings, text labels, or other appearance characteristics for selected components or flightlines. The user can also move a component or group of components from one position to another. A selected component or group of components can be affixed to the canvas. In this way the user can manipulate other components near the affixed component, without affecting the position of the affixed components. When components are rearranged or moved the flightlines connecting them typically follow their movement without further input from the user. By combining the above features of affixing the components to the canvas, auto-selecting all input or output flightlines, and auto-arranging and moving components based on the flightlines to which they are associated, the visualization system can be used to quickly arrange large numbers of components into logical order. FIG. 2 shows an example of an arrangement of numerous components according to signal flow. In actual practice this arrangement took very little time to achieve using the selection and positioning features of the flightline visualization system. The component selection feature let the user to selectively group components into manageable sets. This feature is discussed in more detail below, in conjunction with FIGS. 7A-B.

The flightline visualization system allows for a user to select a flightline and, through means of a bind-key, a GUI control, or the like, assign a tag to the net that the flightline represents. As part of rendering the flightlines (or before rendering them) the visualization system may first check to see whether the flightline represents a net with a tag or tags, and render the flightline differently, or not at all, based on the values of the tag or tags. For example, the user may select a flightline and press a button to identify it as a "control" signal. From that point onward, flightlines representing that net will be rendered with a different color or a tag, indicating them to be control signals. The visualization system also allows the user to remove tags or change the tag values. In some implementations a flightline or component may have more than one tag associated with it if it falls into more than one category (e.g., a flightline could have two tags, one for being an input flightline and another for being a transistor flightline). In such cases a decision rule is typically implemented to control how the multiple-tag flightline is displayed.

Another feature that can be achieved by the select and modify components/flightlines procedure of blocks 121-123 allows the user to assign a known value to one or more flightlines. The user first selects a flightline and, by means of a bind-key, GUI control, or the like, assigns a predefined value to the net that the selected flightline represents. Values are: "logic-1," "logic-0" and "unknown" (or "don't care"). Flightlines representing nets with different known values may be rendered differently, for instance, using a predefined color or other visual indicator to represent a given value. In at least one implementation the process of assigning a value to a selected flightline may be achieved by selecting the flightline and pressing predefined keys such as the following keys:

Alt-1 key: Assigns a logic-1 to the net represented by the flightline.

Alt-2 key: Assigns a logic-0 to the net represented by the flightline.

Alt-3 key: Assigns a don't-care value to the net represented by the flightline.

Alt-6 key: Clears all assignments. This is equivalent to selecting every net in turn and pressing Alt-3.

Once the user has completed the sequence of user inputs to assign logic values, the flightlines will then represent nets having known values. The flightline visualization system may then render the flightlines in colors (or with text tags or other visual coding) to represent their values. For example, one implementation renders flightlines according to the following color scheme: flightlines with logic-1 displayed as beige; flightlines with logic-0 displayed as dark grey; and flightlines with "unknown" (or don't care) logic are displayed in the usual manner as blue for inputs or red for outputs. In addition, flightlines may be display in other predefined colors if the net is identified as a clock, a reset, a control, or other known signal type.

The system is configured so that the visual modifications made as part of the options available in blocks 121-123 of FIG. 1 are temporary, unless steps are taken to make them permanent. For example, the key stroke procedure described above to assign "temporary" values to a net (logic-1 or logic-0) may be undone in batch using another predefined (e.g., the Alt-6 key). The flightline visualization system also allows the user to make "quasi-permanent" assignments. One difference between temporary and quasi-permanent assignments is that the quasi-permanent assignments are not cleared by a predefined key such as Alt-6. This is useful for assigning nets which belong to chip operating modes, such as scan modes or other test modes. A user may assign the scan mode control signals to force the chip into mission-mode and make this assignment quasi-permanent. This effectively highlights gates associated with scan-mode, and in most cases, removes the display of flightlines associated with scan-mode data flow. Since quasi-permanent assignments tend not to be very common, some embodiments of the system do not have bind keys to control them. In at least one implementation the process of making quasi-permanent assignments may be achieved as follows:

1. Clear all current temporary assignments (Alt-6)
2. Make any necessary assignments, using Alt-1 through Alt-3
3. Enter the command to specify the assignments as quasi permanent
4. Clear the current temporary assignments (Alt-6)

This keystroke procedure will result in temporary assignments becoming quasi-permanent.

If a user assigns a logic value to a group of flightlines defined as a net, the flightline visualization system attempts to provide consistent net values throughout the circuit. In response to a change in the net's assigned value, the flightline tool will attempt to compute output values for gates that are driven by the net. For example, if the input of an AND gate is assigned to be zero, then the output of that AND gate is bound to be zero, regardless of the other input value. The flight-line tool will automatically perform a temporary assignment of logic-0 to the AND gate's output net. Now that the AND gate's output is known, the flight-line tool attempts to compute outputs for gates to which that AND gate is connected, and so on throughout the design to produce a consistent result. In order to perform these calculations the flightline visualization system maintains preprogrammed truth tables for most common gates, including: buffers, inverters, AND gates, OR gates, NAND gates, NOR gates, XOR gates, multiplexers of various types, flip-flops, as well as many other electronic elements and logic devices known to those of ordinary skill in the art. The functionality of additional gates and custom components may easily be added to the flightline visualization system. In various embodiments the flightline visualization system displays an alert or error message if logical inconsistencies are discovered in the circuit.

Returning to FIG. 1, if it is determined in block 121 that the user has selected one or more flightlines or components the method proceeds from 121 along the "YES" path to block 123 to implement the changes to the selected elements. Once the system has rendered the elements in the desired manner the method proceeds from 123 to block 125. Back in block 121, if the system determines that no elements are selected for alteration the method proceeds from 121 along the "NO" path to 125. If the system is to continue displaying the circuit the method proceeds from block 125 along the "YES" path back to block 117 to again determine whether there are any inputs from the user to change the manner of displaying the flightlines and components. However, if it is determined in block 125 that the circuit is no longer to be displayed the method proceeds from 125 along the "NO" branch to 127 where the method ends.

FIG. 3 depicts an example of flightlines presented as data rather than being rendered in a circuit image. Although the discussion of flightlines above centers mostly on visual connections between the local component and foreign components, flightlines may also be expressed solely in terms of data. For example, the visualization system may present flightlines as entries in a table of data. In such embodiments the component of interest may have a data table associated with it. Typically, each flightline in the data table would have an entry for the foreign component, and possibly an entry for the signal direction, as well as entries for any other information of interest about the flightline. The flightline data may be stored as an alternative to rendering flightlines graphically, directly on the circuit canvas, between the local component and various foreign components. The visualization system can create a table of data based on flightlines which the user can toggle to instead of displaying the flightlines graphically as lines. The act of displaying flightlines in a data table format on the display screen of a computer may be referred to as rendering the flightlines.

The data table implementation of FIG. 3 provides flightline types and the cell names of the foreign components. For example, the flightlines are characterized as either inputs or outputs. The embodiment also depicts the number of inputs (i.e., 12) as well as the number of outputs (i.e., 53) for the component of interest. In this implementation the data is presented in two sections, an input section (built from flightlines whose type is "input"), and an output section (built from flightlines whose type is "output"). The system also provides a list of the cell names of all foreign instances, that is, the components at the other end of each flightline opposite the component of interest. This embodiment also counts the number of connections to each type of foreign component (to each component name), and presents a list of this data sorted by the number of connections. Other embodiments may choose to display additional information pertaining to the flightlines, and may organize, sort, or present the table of information in any other manner convenient for the user.

Figure 4:
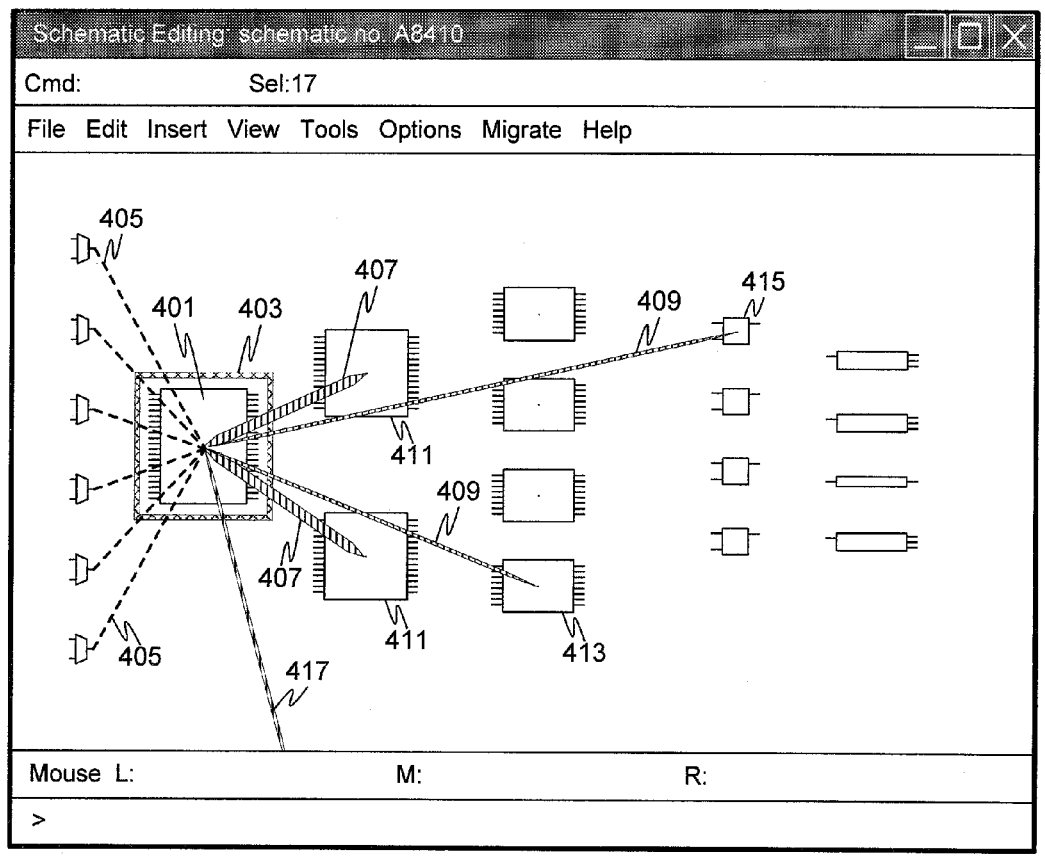
FIG. 4 depicts flightlines interconnecting circuitry components in an component-to-component mode.

FIG. 4 depicts flightlines interconnecting circuitry components in the component-to-component mode, also referred to as an instance-to-instance mode. The various embodiments disclosed herein involve systems and methods for visualizing the connections between components of a circuit. The following example discusses several aspects of flightlines. The example circuit contains a component named "A" which connects to two components, "B" and "C." The "B" and "C" components do not connect directly to each other. In the example, a user selects component "A," designates it as the component of interest, and uses the system to generate flightlines. In this case, "A" is the local component. Since there is a connection between "A" and "B" the system will draw a flightline between "A" and "B." Component "B" is considered to be a foreign instance. Furthermore, since there is a connection between "A" and "C" the user will see a flightline drawn from "A" to "C" to represent that connection. Component "C" is also a foreign component in the example. However, if the user selects component "B" and directs the system to draw flightlines, the user will see only one line drawn from "B" to "A" since component "B" does not connect directly to "C." Since there is no "B"-"C" connection the system will not drawn a flightline between these two components.

Another consideration of flightlines is direction between components. Although it is convenient to think of flightlines being drawn "from" its local component "to" its foreign components, in practice, the flightlines themselves have no inherent direction. They simply indicate that there is a connection between two components. The signal flow along a flightline may, however, have a direction associated with it. Depending upon the system parameters and flightline display settings the system may be set up to render the flightlines in a manner to visually indicate the direction of signal flow. For example, all of the inputs to the local component may be shown in one predetermined color, while the outputs are displayed in a different predetermined color. The flightline line weight, line design, or other flightline appearance characteristics may also be used to distinguish between inputs, outputs, or other categories of flightlines.

Usually, there are at least two foreign components for each local component, but this not a requirement. For example, a buffer cell with an unconnected output will have only one foreign component, its driver. It is possible that some components on a substrate have no flightlines. For example, a redundant, disconnected transistor may have no foreign components, and thus, would have no flightlines. A ferrite bead is another example of a component that may not have any flightline. A ferrite bead is sometimes placed over a signal trace or around an electrical wire in a circuit to dampen spurious signals known the travel down the signal path. On the other hand, it is also possible that a single flightline would have two or more foreign components. For example, the component of interest could have one output to a circuit trace that connects to two or more other components.

It should be noted that a local and foreign component pair may actually have more than one signal which connects them together. This can be handled in a couple of different manners, depending upon the system parameters and flightline display settings. In some implementations the visualization system draws one flightline per signal, thus showing multiple flightlines between components if more than one signal trace connects the components. In another implementation the system may be set to draw one flightline to represent the bundle of signals which form the connections between the components. The visualization system is typically set up to render such bundled flightlines in a manner that highlights the bundle containing multiple signals, that is, by adjusting the rendering to indicate the number of signals in the bundle.

The visualization system allows for flightlines to be classified into different types depending on a variety of conditions. One common condition is the direction of signal flow. As mentioned above, each flightline represents the connection or connections between a local and foreign component, without a direction associated with the flightline itself. However, the signal that travels the flightline may have a direction. If the signal originates from an output pin on the foreign component and terminates at an input pin on the local instance, then that flightline may be classified as an "input," as understood from the local component's point of view. Conversely, if the signal originates from an output pin on the local component, and terminates on an input pin on the foreign instance, then that flightline may be classified as an "output," again, from the local component's point of view. Flightline classification is not limited to signal direction. Any predicate or condition may be used, for instance, the name of the pin on the foreign instance to which the signal connects, the signal's fan-out, whether the signal is a voltage supply or ground, the type of component the flightline connects to or originates from (e.g., a transistor, a flip-flop, type of logic gate, or the like), or any other like conditions or parameters that characterize the flightline. The flightline may even be characterized by the geometry of the signal line or circuit board trace itself, for example, the size of the trace, whether the signal line is shielded or not, whether the trace is on a particular circuit board plane, layer or level, whether the trace passes from one layer to another or is a vertical trace (via hole), or other like characteristics known to those of ordinary skill in the art. Finally, a flightline may be characterized by a tag or tags which the user has chosen to assign to it during the analysis of the circuit.

Various embodiments of the visualization system disclosed herein allow different types of flightlines to be rendered in different manners on the screen. For instance, different types of flightlines may be color coded. In one embodiment "input" flightlines are drawn in cyan and "output" flightlines appear in deep red. In addition to color, the system may also use different line styles, stipple patterns, or line thicknesses to distinguish flightline types, e.g., dashed lines, dotted lines, and/or lines of varying thickness. In some implementations the visualization system does not to use lines at all, instead using text labels or other shapes, or simply present tables to the user, to indicate that the local and foreign components are connected, and provide any other desired information about the characteristics of the flightline.

Various embodiments of the visualization system allow for flightlines to be made visible or invisible according to instructions specified by the user, or to be displayed in another predetermined manner. In some embodiments the system can be set up to toggle through different display states to highlight various aspects of interest to the user. The toggle states are typically set up in the initial system parameters and flightline display settings. Toggling from one display state to another is done in response to an input from the user. For example, in one embodiment, in response to a user input (e.g., the user pressing a predefined toggle key such as the "7" key), the flightline display switches through a three-state cycle whose states are: 1) All flightlines are visible and selectable; 2) Only input flightlines are visible and selectable; and 3) Only output flightlines are visible and selectable. In this example there are three display states that the system toggles through. In practice there may be any number of display states predefined by the user. The toggle key and the display states that the system toggles through may be predefined by the user. Instead of toggling through the display states in succession, the various embodiments may associate a particular display state with a predefined key; e.g., the "7" key being associated with Display State1, the "8" key being associated with Display State2; and the "9" key being associated with Display State3.

Various embodiments of the flightline visualization system have the capability to dynamically visualize circuitry in a number of different manners and modes, including the ability to switch dynamically visualization features on and off. One of these dynamic visualization features is the ability to display symbols on a canvas representing the components in a circuit. Another dynamic visualization feature is the ability to selectively move circuitry symbols to different locations. Other implementations include the dynamic visualization feature of creating hierarchies of components (where one symbol may represent many components). These implementations can toggle between various predefined levels of detail. The flightline visualization system also has the ability to keep track of connections between components in a database. Another dynamic visualization feature is the ability to load and save the state of the canvas and component hierarchies. Various embodiments can be configured with the ability to draw annotation shapes (e.g., lines, rectangles or text labels) on the canvas alongside the components. The system can also receive user inputs to select one or more components or annotations for modification or formatting.

Referring again to FIG. 4, the instance-to-instance flightline embodiment depicted renders flightlines between local and foreign components. In the instance-to-instance mode of FIG. 4 the lines begin and end at the center of the local and foreign component symbols. The line thickness in various embodiments is proportional the number of signals which share the same local and foreign instance. Other visualization coding features may also be utilized to indicate the number of signals sharing the same local and foreign instance, for instance, the number of tick marks or other visual cues per unit distance on the flightline (e.g., tick marks per inch). In the implementation shown in the figure, if the component on one end of a flightline is outside the window of the computer screen the line simply runs to the edge of the screen, as per flightline 417. In some embodiments, the user manipulating the mouse to hold the cursor over a flightline extending off the screen will cause a pop-up window to appear showing the foreign component located off-screen.

The flightlines may also be rendered using a number of different visualization cues to indicate features or characteristics of the connection between the components. For example, flightlines 405 are drawn in a dashed-line format, in this case, indicating that they are inputs to component 401. The lines 407-409 are drawn with a predefined pattern indicating components which consume the output of component 401, the component of interest. Notice that two lines 407 are drawn very thick, as compared to output lines 409. The line thickness in this implementation indicates that there are multiple signals which output from component 401 to the two components 411. The flightlines connecting component 401 to components 413 and component 415 are not as thick, indicating relatively fewer outputs to these components. Other visual cues aside from line thickness may be used to indicate the number of connections, e.g., lineweight (darkness or thickness of the line), color of the line, a text box associated with the line, or the like. In various embodiments the screenshot or view for a given component of interest may include a legend for the visual coding associated with the displayed flightlines. The legend may either be visible at all times, or accessible via a dropdown menu, a pop-up window, or a legend icon or button displayed on the computer screen.

In the example depicted in FIG. 4 the user has selected component 401 as the component of interest. In various embodiments the component of interest is indicated by a visualization cue on the display. For example, in the embodiment of FIG. 4 component 401 is indicated as the component of interest by the crosshatch box 403 drawn around it. Different component-of-interest visualization cues may be used to indicate the component of interest in other implementations, e.g., a white/colored box, a shaded portion, or the like.

Figure 5:
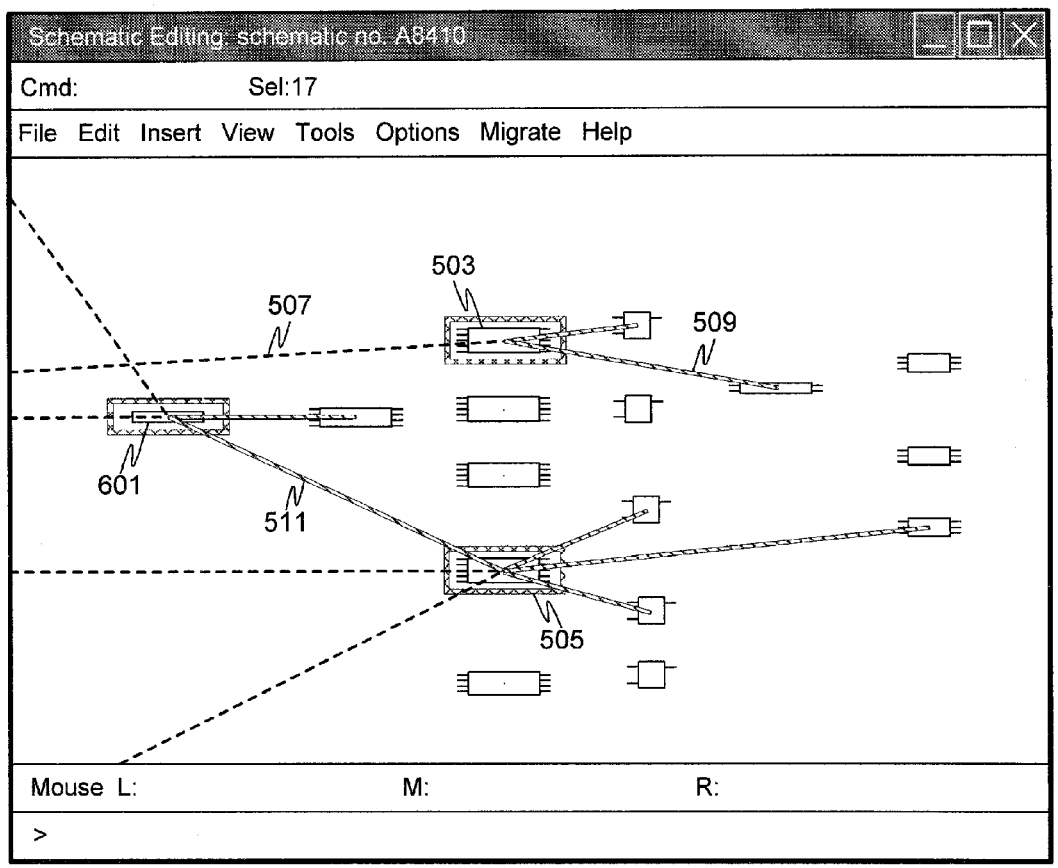
FIG. 5 depicts flightlines in a component-to-component mode with multiple components of interest.

FIG. 5 depicts flightlines for multiple components of interest in the component-to-component mode. Depending upon the circuitry being analyzed and the needs of the user, the user may specify more than one local component. In such cases, the system performs the flightline computation and rendering procedure for each of the multiple local instances. The system may then choose to, or choose not to render flightlines whose local and foreign instance are both components of interest. This may be done either under control of the user or as a predefined option specified within the system. FIG. 5 shows the rendering of flightlines for three components of interest, component 501, component 503 and component 505. In this case, flightlines both to and from the selected components of interest are rendered. At the user's discretion the system may omit the rendering of flightlines whose local and foreign components are components of interest. In this mode, flightline 511 would not have been rendered.

In the component-to-component mode of FIG. 5 with multiple components of interest, the visualization system renders flightlines between the three local components and their respective foreign components. As before, lines may be color coded or provided with some other visual cue to indicate signal direction, or other characteristics. In the figure, the dashed lines (e.g., 507) indicate inputs to a component of interest. The crosshatched lines (e.g., 509) indicate an output from a component of interest. Some flightlines may be an output to one component of interest and an input to another component of interest, such as the flightline 511 which is an output of component 501 and an input to component 505. In such situations a predetermined decision rule is used for to provide a visual cue indicating the flightline to be either an input or an output. The user may specify a hierarchy of components. In such cases the common flightline (e.g., 511) is displayed from the perspective of the component ranked highest in the hierarchy. In FIG. 5 the component 501 is ranked higher than component 505. Therefore flightline 511 is depicted as an output to component of interest 501. Another simple decision rule is to show the flightline consistent with the order that the component was selected as a component of interest (or the reverse order). The components selected first (or last) take priority over those selected later with respect to displaying the flightlines. Another manner of treating dual input/output flightlines is to show half the flightline as an input to one component of interest and half the flightline as an output to the other component of interest. Yet another manner of treating common flightlines is simply not to render them at all.

Figure 6:
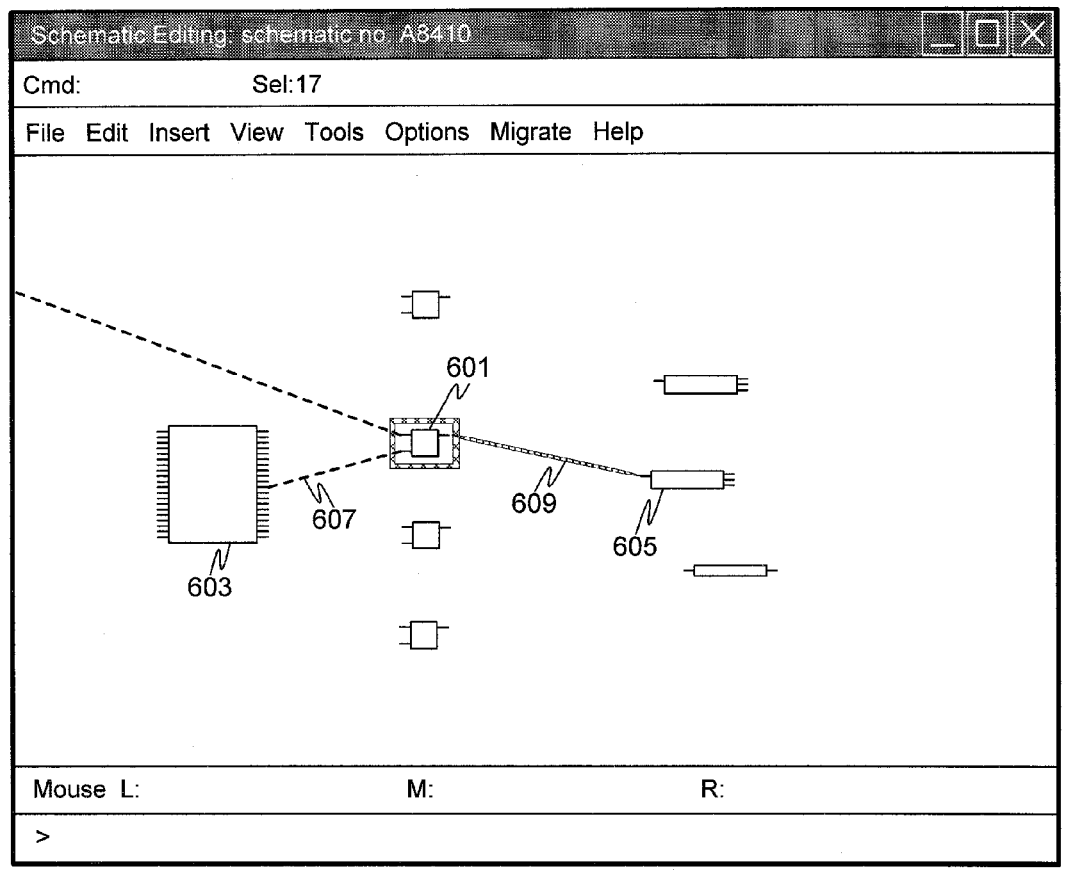
FIG. 6 depicts a detailed view of flightlines in a pin-to-pin mode.

FIG. 6 depicts a detailed view of flightlines in a pin-to-pin mode. The pin-to-pin mode results in a more precise and informative manner of displaying flightlines for a circuit diagram. In the pin-to-pin mode each flightline begins at a pin of one component and ends at a pin on another component. In this way the pin-to-pin mode provides a greater level of detail than flightlines merely connecting to the centers of each component as per FIGS. 4-5. In the pin-to-pin embodiment of FIG. 6 each flightline shows not only which components interconnect to each other, but also the pin on the local component connects to a particular pin on the foreign component. In this mode, flightlines are generally the same thickness since a given flightline generally does not connect to more than one pin on either end. However, it is possible that in some circuitry a flightline connecting to a pin on the component of interest may split off and feed two or more inputs of the same component or other components. In such instances the flightline may be shown as thicker, darker, or with another visual cue to indicate it feeds multiple inputs.

The component 601 of FIG. 6 is depicted with a visual cue indicating it is the local instance (i.e., the cross-hatched box surrounding component 601). In this embodiment the visualization system has rendered flightlines from pin to pin. The dashed line 607 indicates that the local instance, component 601, receives an input from a pin of the foreign component 603. The crosshatched line 609 indicates that component 601 generates an output for the foreign component 605. In the event a given flightline has special significance, it can be coded with a predetermined color, line style, or labeled with a text box indicating its significance to the circuit or other visual cue.

Figure 7A:
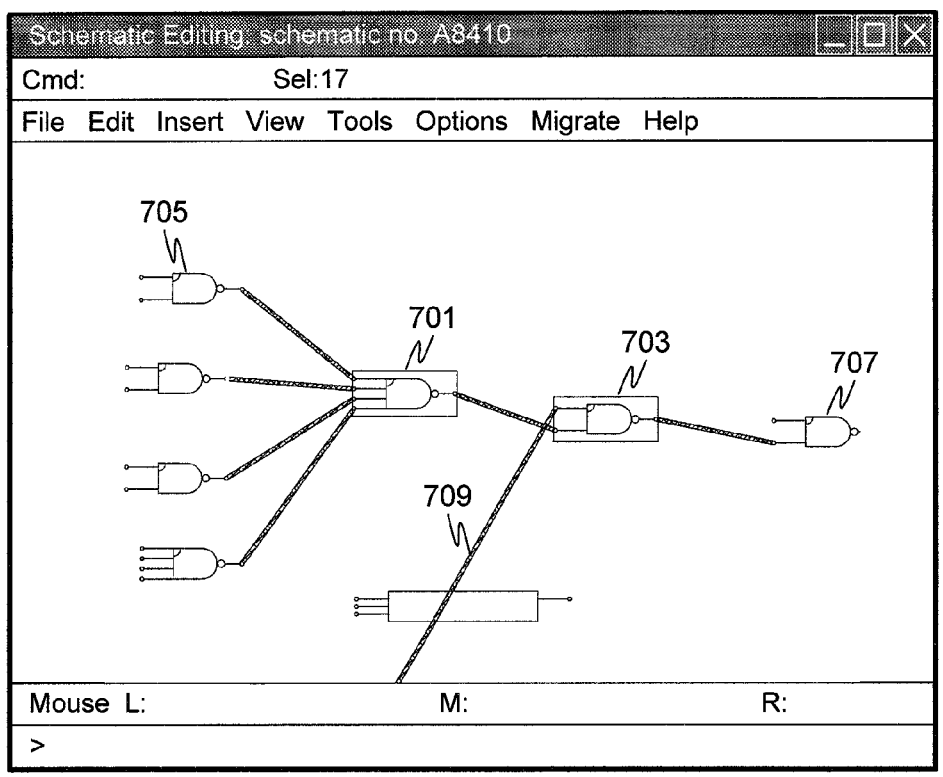
FIG. 7A depicts a schematic for two components of interest before grouping.
Figure 7B:
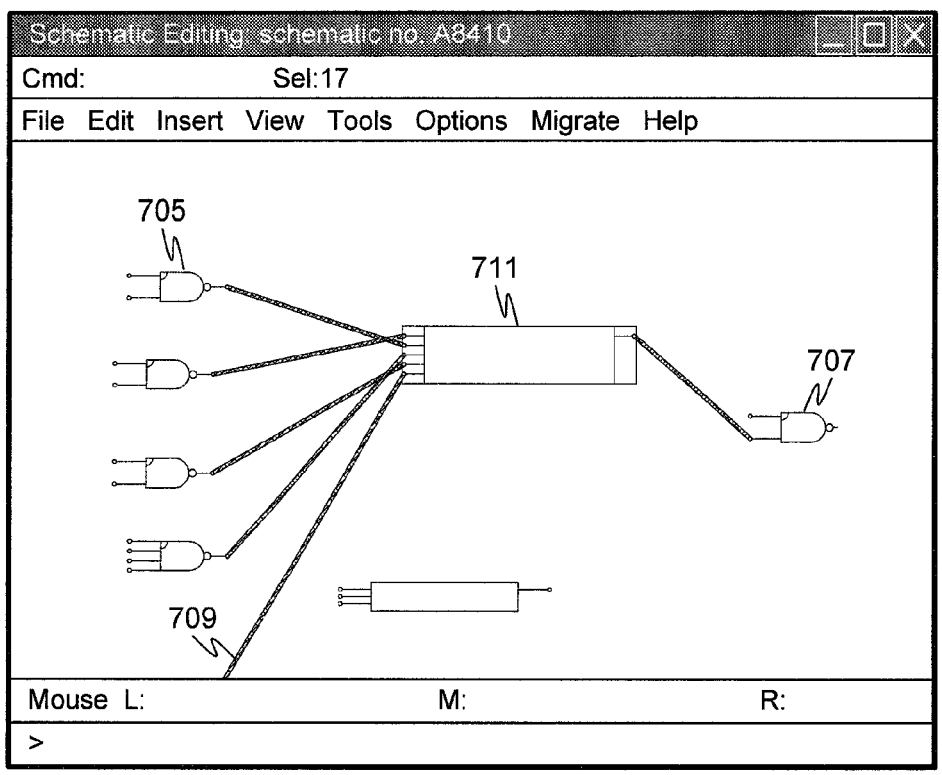
FIG. 7B depicts the circuit from FIG. 7A with the two components of interest grouped to be one component.

FIG. 7A depicts a schematic for two components of interest before grouping. The two components of interest are NAND gate 701 and NAND gate 703. NAND gate 701 has several inputs, including 705, as indicated by the flightlines into 705. The NAND gate 703 has two inputs indicated by the flightline from the output of 701 and the flightline 709 from a component off the screen. To group the components 701 and 703 the user first selects them, for example, by drawing a selection box around them or by clicking on each component with the mouse. The flightline visualization system allows the user to form a group by enacting the group command on the selected components. FIG. 7B shows the results of grouping the two components 701 and 703.

FIG. 7B depicts the circuit from FIG. 7A with the two components of interest 701 and 703 grouped to be one component 711. The components are replaced by a single component, but the connections are preserved. The new group component 711 has all the inputs of 701 from FIG. 7A, as well as the input 709 from the component 703. The component 711 has the output to component 707 also. Note that the flightline between 701 and 703 of FIG. 7A is not reflected in FIG. 7B since this flightline is internal to the group making up component 711. In various embodiments the user is presented with the option of viewing details of the group, for example, by hovering over the group component 711.

The component selection feature lets the user selectively group components into manageable sets. Thus, a component may be a single atomic circuit element, such as a transistor or logic gate. However, a component may also be a group of such elements. The flightline visualization system can represent such multi-element components using a symbol in the main schematic, and, at the user's request, allow the user to see details of the group in a schematic all to itself. This act is commonly known as "descending" through the schematic hierarchy.

The visualization system can draw flightlines on any schematic, be it the "top" schematic, or one of these group schematics. However, it should be noted that the schematics of the top level and any specified group are considered to be separate schematics. The inventors discovered that a user will often want to see how the internal parts of a group schematic connect to the rest of the top schematic. To address this need the visualization system provides a function to un-group a component which consists of elements. To do this, the system first removes the symbol representing the group from the top schematic. Then, it places each member of the group onto the top schematic, taking care to preserve component-to-component connectivity. From this point on, the visualization system typically treats the new components like any other component.

Just as components can be ungrouped, so too can components on the top-level schematic be regrouped or grouped in different combinations. The visualization system allows a user to select one or more components on the top-level schematic, and invoke the grouping function. The grouping function creates a new schematic, and gives the group a unique name (or accepts a user input for a new group name). The system moves the components selected for the group from the top-level schematic to the newly-created schematic. The flightline visualization system may be configured to create pins for the group/component to indicate connections between a component moved to the group in the new schematic, and another component remaining on the top-level schematic. The system is typically configured to assign these new pins a suitable direction, e.g., input, output, supply voltage, or other appropriate category. The functionality for grouping components or elements can be associated with a predefined key (e.g., the "F6" key) or other user input such as a drop down menu or the like.

Figure 8A:
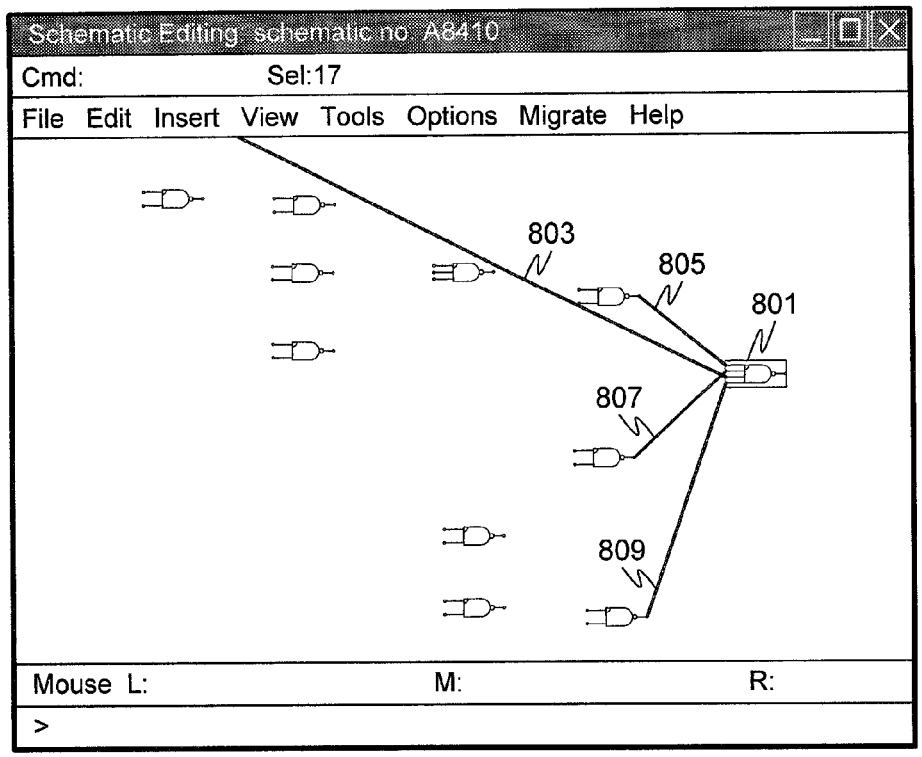
FIGS. 8A and 8B demonstrate the categorization of flightlines as important/unimportant and selectively displaying the important flightlines.
Figure 8B:
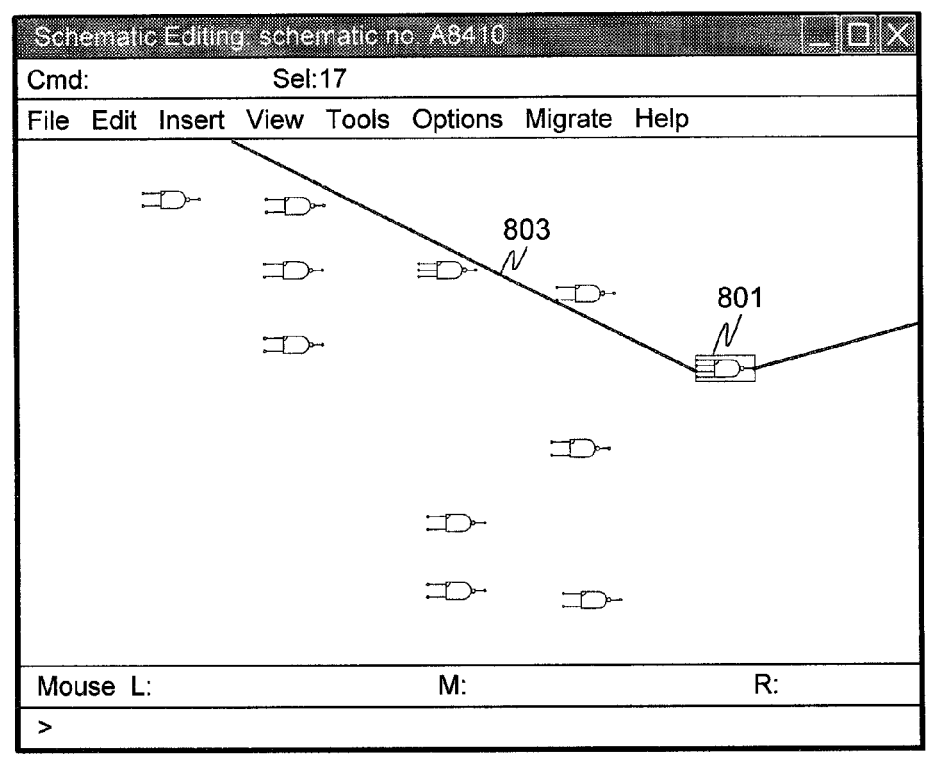

FIGS. 8A and 8B demonstrate the categorization of flightlines as important/unimportant and selectively displaying the important flightlines. FIG. 8A depicts a number of flightlines, including some flightlines categorized as unimportant that are then eliminated from the diagram depicted in FIG. 8B. It can be helpful in understanding the operation of a circuit to simplify the circuit to the extent possible without eliminating signals that contribute to the functionality or current state. Various embodiments of the flightline visualization system include a feature for reducing the number of flightlines displayed based on current assignments and computations. For example, if one input of a 2-input AND gate is set to logic-0, then the output of the AND gate must also be logic-0. The second input cannot possibly change the output value. Therefore the second input is not important, given that the first input is set to logic-0, and the flight-line tool will not normally display it. Furthermore, if the unimportant input is driven solely by another gate, then the inputs to the other gate are also not important, because their value cannot possible change a known value further along the signal propagation chain.

To determine which flightlines are important, various embodiments can determine the "unimportance" of a gate based on the following two decision rules:

A gate whose output is known, is said to be unimportant.
A gate that drives ONLY unimportant gates, is also said to be unimportant.

To determine which flightlines should be rendered, various embodiments can abide by the following decision rules:

A flightline which represents a net having a known value (i.e., either logic-0 or logic-1) will always be displayed.
A flightline will always be displayed if the global setting "iForceDisplayFlightLines" is set.
A flightline which originates at an unimportant gate AND terminates at an unimportant gate will NOT be displayed.
If none of the above conditions apply, the default is to display the flightline.

The user may toggle the "iForceDisplayFlightLines" setting by pressing a predefined key, e.g., Alt-7.

Turning to FIG. 8A, a number of flightlines are displayed for the NAND gate 801.

If flightline 803 has an assigned value of logic-0 (or is otherwise know to be logic-0), then the inputs of flightlines 805, 807 and 809 are don't care function, that is, they will not affect the output of component 801 regardless of whether they are logic-0 or logic-1 taken in any combination. For this reason, the flightlines 805, 807 and 809 are designated as unimportant when flightline 803 is known to have a value of logic-0.

FIG. 8B corresponds to FIG. 8A, except with the flightlines 805, 807 and 809 eliminated since they are categorized as unimportant when flightline 803 is known to be logic-0. Note that the NAND gate 801 has a value of logic-1. But this value is not assigned by the user, rather, it was computed by the flight-line tool in response to the flightline 803 having a known value of logic-0. A NAND gate with one input set to logic-0 will always have an output of logic-1. In some embodiments there are other display options for the rest of the input pins to the NAND gate 801 rather than showing them with no flightlines attached, as per FIG. 8B. For example, in some implementations flightlines deemed to be unimportant can be displayed in a muted manner, say, by lines that are thinner and less noticeable or in pale colors that are easy for a user to disregard.

Figure 9:
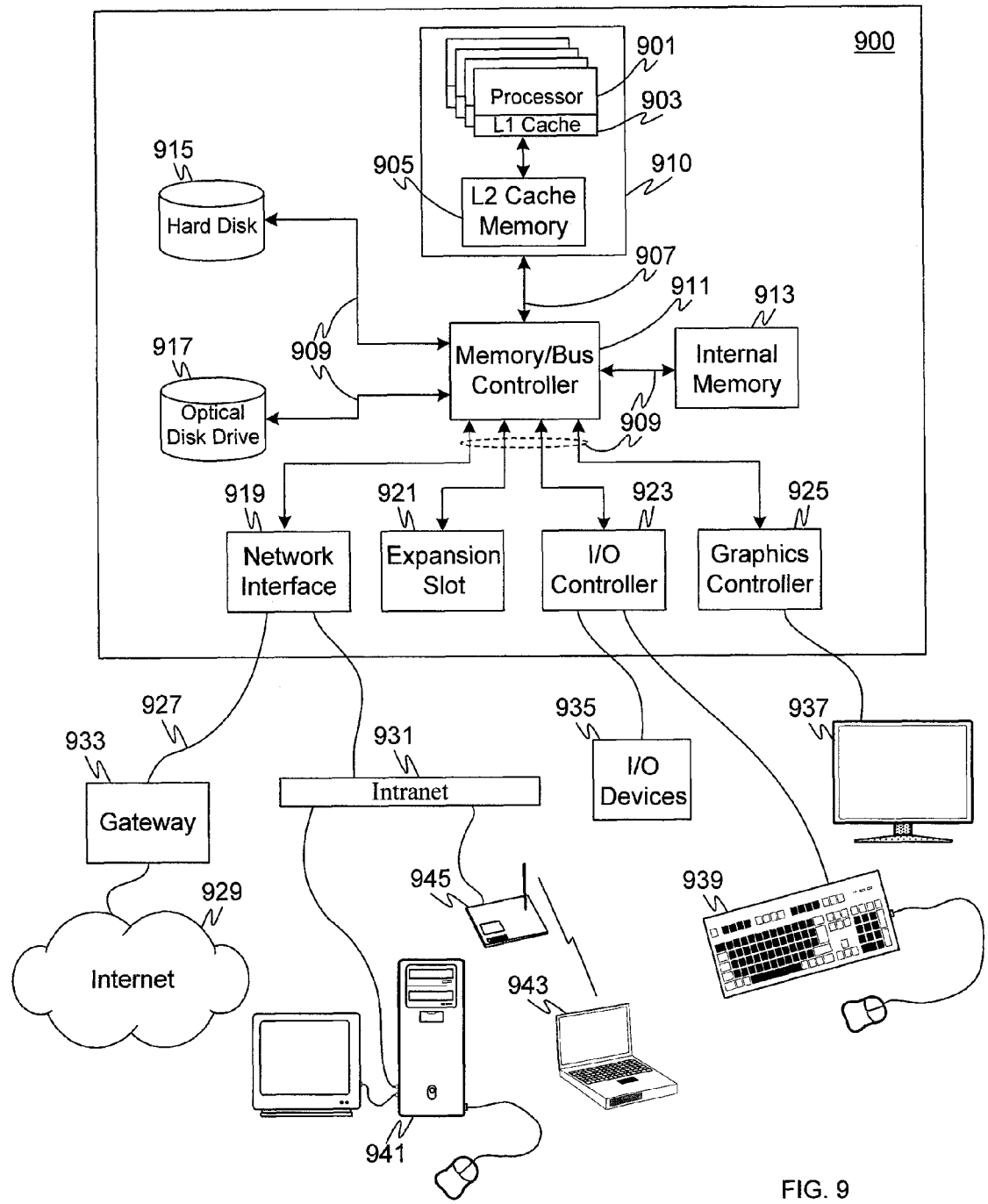
FIG. 9 depicts a computer system suitable for implementing various embodiments of the invention.

FIG. 9 depicts a computer system 900 and various components suitable for implementing the various embodiments disclosed herein. The computer system 900 may be configured in the form of a desktop computer, a laptop computer, a mainframe computer, or any other hardware or logic arrangement capable of being programmed or configured to carry out instructions. In some embodiments the computer system 900 may act as a server, accepting inputs from a remote user over a local area network (LAN) 927, the Internet 929, or an intranet 931. In other embodiments, the computer system 900 may function as a smart user interface device for a server on the LAN 927 or over the Internet 929. The computer system 900 may be located and interconnected in one location, or may be distributed in various locations and interconnected via communication links such as a LAN 927 or a wide area network (WAN), via the Internet 929, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 900, although only one typical architecture is depicted in FIG. 9.

Computer system 900 may include a processor 901 which may be embodied as a microprocessor, two or more parallel processors as shown in FIG. 9, a central processing unit (CPU) or other such control logic or circuitry. The processor 901 may be configured to access a local cache memory 903, and send requests for data that are not found in the local cache memory 903 across a cache bus to a second level cache memory 905. Some embodiments may integrate the processor 901, and the local cache 903 onto a single integrated circuit and other embodiments may utilize a single level cache memory or no cache memory at all. Other embodiments may integrate multiple processors 901 onto a single die and/or into a single package. Yet other embodiments may integrate multiple processors 901 with multiple local cache memories 903 with a second level cache memory 905 into a single package 910 with a front side bus 907 to communicate to a memory/bus controller 911. The memory/bus controller 911 may accept accesses from the processor(s) 901 and direct them to either the internal memory 913 or to the various input/output (I/O) busses 909. Some embodiments of the computer system 900 may include multiple processor packages 910 sharing the front-side bus 907 to the memory/bus controller. Other embodiments may have multiple processor packages 910 with independent front-side bus connections to the memory/bus controller. The memory bus controller may communicate with the internal memory 913 using a memory bus 909.

The internal memory 913 may include one or more of random access memory (RAM) devices such as synchronous dynamic random access memories (SDRAM), double data rate (DDR) memories, or other volatile random access memories. The internal memory 913 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 900 may also include $3^{rd}$ level cache memory or a combination of these or other like types of circuitry configured to store information in a retrievable format. In some implementations the internal memory 913 may be configured as part of the processor 901, or alternatively, may be configured separate from it but within the same package 910. The processor 901 may be able to access internal memory 913 via a different bus or control lines than is used to access the other components of computer system 900.

The computer system 900 may also include, or have access to, one or more hard drives 915 (or other types of storage memory) and optical disk drives 917. Hard drives 915 and the optical disks for optical disk drives 917 are examples of machine readable (also called computer readable) mediums suitable for storing the final or interim results of the various embodiments. The optical disk drives 917 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 900 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 900 may either include the hard drives 915 and optical disk drives 917 as an integral part of the computer system 900 (e.g., within the same cabinet or enclosure and/or using the same power supply), as connected peripherals, or may access the hard drives 915 and optical disk drives 915 over a network, or a combination of these. The hard drive 915 often includes a rotating magnetic medium configured for the storage and retrieval of data, computer programs or other information. In some embodiments, the hard drive 915 may be a solid state drive using semiconductor memories. In other embodiments, some other type of computer useable medium may be used. The hard drive 915 need not necessarily be contained within the computer system 900. For example, in some embodiments the hard drive 915 may be server storage space within a network that is accessible to the computer system 900 for the storage and retrieval of data, computer programs or other information. In some instances the computer system 900 may use storage space at a server storage farm, or like type of storage facility, that is accessible by the Internet 929 or other communications lines. The hard drive 915 is often used to store the software, instructions and programs executed by the computer system 900, including for example, all or parts of the computer application program for carrying out activities of the various embodiments.

The communication link 909 may be used to access the contents of the hard drives 915 and optical disk drives 917. The communication links 909 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 909. In some embodiments, the links 909 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 909 may be a point-to-point link such as PCI-Express, HyperTransport, or any other point-to-point I/O link. Various I/O devices may be configured as a part of the computer system 900.

In many embodiments, a network interface 919 may be included to allow the computer system 900 to connect to a network 927 or 931. Either of the networks 927 and 931 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 933 or router, which may be a separate component from the computer system 900 or may be included as an integral part of the computer system 900, may be connected to the networks 927 and/or 931 to allow the computer system 900 to communicate with the Internet 929 over an internet connection such as an asymmetric digital subscriber line (ADSL), data over cable service interface specification (DOCSIS) link, T1 or other internet connection mechanism. In other embodiments, the computer system 900 may have a direct connection to the Internet 929. The computer system 900 may be connected to one or more other computers such as desktop computer 941 or laptop computer 943 via the Internet 929, an intranet 931, and/or a wireless node 945. In some embodiments, an expansion slot 921 may be included to allow a user to add additional functionality to the computer system 900.

The computer system 900 may include an I/O controller 923 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 923. A graphics controller 925 may also be provided to allow applications running on the processor 901 to display information to a user. The graphics controller 925 may output video through a video port that may utilize a standard or proprietary format such as an analog video graphic array (VGA) connection, a digital video interface (DVI), a digital high definition multimedia interface (HDMI) connection, or any other video connection. The video connection may connect to display 937 to present the video information to the user.

The display 937 may be any of several types of displays or computer monitors, including a liquid crystal display (LCD), a cathode ray tube (CRT) monitor, on organic light emitting diode (OLED) array, or other type of display suitable for displaying information for the user. The display 937 may include one or more light emitting diode (LED) indicator lights, or other such display devices. Typically, the computer system 900 includes one or more user input/output (I/O) devices such as a keyboard and mouse 939, and/or other means of controlling the cursor represented including but not limited to a touchscreen, touchpad, joystick, trackball, tablet, or other device. The user I/O devices 935 may connect to the computer system 900 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 900 typically has a keyboard and mouse 939, a monitor 937, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The computer system 900 may be suitable for use in identifying critical web services and dynamically relocating them to a new server. For example, the processor 901 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on non-transitory computer-readable medium such those compatible with the disk drives 915, the optical disk drive 917 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more non-transitory computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other that that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A method of utilizing a computer to describe non-reconfigurable interconnections between a plurality of components in a circuit, each interconnection being configured to convey at least one signal between a respective pair of the plurality of components, each signal in the circuit being of a common nature, the method comprising:
   identifying each interconnection between a local component and other ones of the plurality of components of the circuit, wherein the local component comprises at least one of the plurality of components in the circuit;
   identifying, in the computer, at least one rule for rendering a flightline, the at least one rule for associating a value of a display attribute of a flightline with a value of a category represented by the at least one signal, relative to the local component; and
   displaying, on a display of the computer, a respective flightline for each identified interconnection in accordance with the identified at least one rule.

2. The method according to claim 1, further comprising:
   identifying, at least one second rule for rendering a flightline and updating the display to render the respective flightline for each identified interconnection in accordance with the at least one second rule.

3. The method according to claim 1, further comprising:
   identifying a second one of the plurality of components as the local component and updating the display to display a respective flightline for each interconnection between the second component and other ones of the plurality of components of the circuit, in accordance with the at least one rule.

4. The method according to claim 1, wherein the action of identifying a first component as the local component comprises identifying a plurality of components of the circuit and treating the plurality of components as a single component designated as the local component.

5. The method according to claim 1, wherein the display attribute is comprises any one or more of: thickness, colour, stipple, pattern, fill, line style and user-specified.

6. The method according to claim 1, wherein the category comprises any one or more of: signal direction, signal type, number of signals, and user-specified,
   wherein the signal direction comprises any one or more of: input, output and feedback, and
   wherein the signal type comprises any one or more of: clock, reset, select, power, ground, data and address.

7. The method according to claim 1, wherein each signal in the circuit is an electrical signal.

8. The method according to claim 1, wherein the action of displaying a flightline comprises visually rendering the flightline.

9. The method according to claim 8, wherein the action of visually rendering the flightline comprises obtaining at least one flightline display setting, the at least one flightline display setting being configurable, wherein appearance characteristics of the flightline are controlled by the at least one flightline display setting.

10. The method according to claim 9, wherein the at least one flightline display setting is obtained from a user input.

11. The method according to claim 9, wherein the at least one flightline display setting is obtained from circuit information from the circuit.

12. The method according to claim 1, wherein the action of displaying a respective flightline comprises identifying a first terminal point of the flightline at a first contact on the local component and a second terminal point of the flightline at a second contact on a foreign component.

13. The method according to claim 12, wherein a physical location of the flightline on the display substantially corresponds to a physical location of the local component.

14. The method according to claim 12, wherein a physical location of the flightline on the display substantially corresponds to a physical location of the foreign component.

15. The method according to claim 12, further comprising altering the display.

16. The method according to claim 15 wherein the action of altering the display comprises displaying the local component.

17. The method according to claim 15, wherein the action of altering the display comprises displaying the foreign component.

18. The method according to claim 15, where the action of altering the display comprises displaying one of the respective flightlines.

19. The method according to claim 15, wherein the action of altering the display comprises either one or both of panning the display and zooming the display.

20. The method according to claim 1, wherein the value of the category of the flightline is determined by tracing the at least one signal corresponding to the at least one interconnection through at least one component other than the local component and the foreign component.

21. The method according to claim 1, wherein the action of visually rendering the at least one flightline comprises displaying a data table representing the at least one flightline.

22. The computer program product comprising computer instructions stored on a non-transitory computer-readable medium, the computer instructions being configured to control a computer to perform a method for describing non-reconfigurable interconnections between a plurality of components in a circuit, each interconnection being configured to convey at least one signal between a respective pair of the plurality of components, each signal in the circuit being of a common nature, the method comprising:

identifying each interconnection between a local component and other ones of the plurality of components of the circuit, wherein the local component comprises at least one of the plurality of components if the circuit;

identifying at least one rule for rendering a flightline, the at least one rule for:

associating a value of a display attribute of a flightline with a value of a category represented by the at least one signal, relative to the local component; and displaying, on a display of the computer, a respective flightline for each identified interconnection in accordance with the identified at least one rule.

* * * * *